(12) United States Patent  (10) Patent No.: US 7,609,777 B2
Garrett  (45) Date of Patent: Oct. 27, 2009

(54) MAXIMUM LIKELIHOOD A POSTERIORI PROBABILITY DETECTOR

(75) Inventor: David Garrett, Pyrmont (AU)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1405 days.

(21) Appl. No.: 10/231,980

(22) Filed: Aug. 30, 2002

(65) Prior Publication Data

US 2004/0042565 A1  Mar. 4, 2004

(51) Int. Cl.
*H03M 13/03* (2006.01)
*G11C 29/00* (2006.01)
*H04L 27/06* (2006.01)

(52) U.S. Cl. ............... 375/262; 375/265; 375/340; 375/341; 714/792; 714/794; 714/795; 714/796; 714/763

(58) Field of Classification Search ........... 375/262, 375/265, 340, 341; 714/792, 794, 795, 796, 714/763, 767
See application file for complete search history.

(56) References Cited

U.S. PATENT DOCUMENTS

| | | | | |
|---|---|---|---|---|
| 5,081,651 | A * | 1/1992 | Kubo | 375/341 |
| 5,263,053 | A * | 11/1993 | Wan et al. | 375/285 |
| 5,675,590 | A * | 10/1997 | Alamouti | 714/786 |
| 6,144,711 | A * | 11/2000 | Raleigh et al. | 375/347 |
| 6,289,000 | B1 * | 9/2001 | Yonge, III | 370/203 |
| 6,301,317 | B1 * | 10/2001 | Ben-Eli | 375/365 |
| 6,487,255 | B1 * | 11/2002 | Arslan et al. | 375/262 |
| 6,556,634 | B1 * | 4/2003 | Dent | 375/343 |

(Continued)

FOREIGN PATENT DOCUMENTS

EP  0905920 A2  3/1999

(Continued)

OTHER PUBLICATIONS

"A Comparison of Optimal and Sub Optimal MAP Decoding Algorithms Operating in the Log Domain", Robertson et al, 1995 IEEE International Conference on Communications, 1995. ICC 95 Seattle, Gateway to Globalization, Jun. 18-22, 1995, pp. 1009-1013 vol. 2.*

(Continued)

*Primary Examiner*—Shuwang Liu
*Assistant Examiner*—Linda Wong
(74) *Attorney, Agent, or Firm*—Carlson, Gaskey & Olds, P.C.

(57) ABSTRACT

A communication device comprising an ML-APP detector coupled to at least two antennas. The ML-APP detector comprises at least one Hx unit coupled to at least one LLR unit. The Hx unit generates a portion of all possible symbols that can be received and transfers each generated symbol candidate to the LLR unit which performs a conversion operation on the transferred symbol candidate to generate another symbol candidate that is not part of the special portion. In this manner all of the possible symbol candidates are obtained by the LLR unit. The LLR unit compares the symbol candidates to a received symbol to perform a cost calculation. The symbol candidate yielding the lowest cost from the cost calculations of all possible symbol candidates is selected as the best candidate. APP decoding is then performed on the selected candidate using soft information associated with the selected candidate which soft information is generated by the LLR unit.

20 Claims, 2 Drawing Sheets

U.S. PATENT DOCUMENTS

| | | | |
|---|---|---|---|
| 6,857,101 B1 * | 2/2005 | Levy | 714/796 |
| 6,891,897 B1 * | 5/2005 | Bevan et al. | 375/265 |
| 6,944,242 B2 * | 9/2005 | Yakhnich et al. | 375/341 |
| 6,944,247 B2 * | 9/2005 | Whetsel | 375/354 |
| 6,977,977 B1 * | 12/2005 | Dubrovin et al. | 375/346 |
| 7,035,354 B2 * | 4/2006 | Karnin et al. | 375/341 |
| 2002/0051501 A1 * | 5/2002 | Demjanenko et al. | 375/298 |
| 2002/0161560 A1 * | 10/2002 | Abe et al. | 702/196 |
| 2003/0031278 A1 * | 2/2003 | Kang et al. | 375/341 |
| 2003/0086366 A1 * | 5/2003 | Branlund et al. | 370/208 |
| 2003/0112901 A1 * | 6/2003 | Gupta | 375/340 |
| 2008/0095121 A1 * | 4/2008 | Shattil | 370/335 |
| 2008/0144746 A1 * | 6/2008 | Waters et al. | 375/340 |

FOREIGN PATENT DOCUMENTS

| | | |
|---|---|---|
| EP | 1 133 097 A | 9/2001 |
| JP | 6232769 A | 8/1994 |
| JP | 11168453 | 6/1996 |

OTHER PUBLICATIONS

"Reliability Basics Maximum Likelihood Function", HotWire: The eMagazine for the Reliability Professional, Issue 33, Nov. 2003, Copyright 1992-2006, pp. 1-5.*

Vikalo H et al: "Low-complexity iterative detection and decoding of multi-antenna systems employing channel and space-time codes" Conference Record of the 36th. Asimolar Conference on Signals, Systems, & Computers, Pacific Groove, CA, Nov. 3-6, 2002, Asimolar Conference on Signals, Systems and Computers, New York, NY: IEEE, US, vol. 1 of 2. Conf. 36. 3 Nov. 2002 pp. 294-298 XP010638219 ISBN: 0-7803-7576-9 p. 295, left-hand column, line 1 - line 5, p. 295, right-hand column, line 18-Line 37, p. 296, right-hand column, line 6-line 30.

The Viterbi Algorithm by G. David Forner, Jr., pp. 268-278—excerpt of Proceedings of the IEEE, vol. 61, No. 3, Mar. 1973.

* cited by examiner

MAXIMUM LIKELIHOOD A POSTERIORI PROBABILITY DETECTOR

BACKGROUND OF THE INVENTION

1. Field of the Invention

The present invention generally relates to communication systems and in particular to receivers used in communication systems.

2. Description of the Related Art

As communication technology evolves, communication systems are able to convey (i.e., transmit and/or receive) information at higher rates. In wireless communication systems, the bandwidth for the system has been set by standards bodies and government organizations. In order to achieve higher data throughput for third generation wireless systems, Multiple Input Multiple Output (MIMO) antenna systems are being considered. MIMO systems for high data bandwidth are based on the BLAST (Bell Laboratories Layered Space Time) concept which uses multiple transmit antennas to transmit different transmit streams in the same spectrum, and takes advantage of multipath channels with an array of receiver antennas to recover the independent streams. One emerging standard for high speed 3G (Third Generation) wireless communications for data is the 3GPP (Third Generation Partnership Program) High Speed Downlink Packet Access (HSDPA) standard. Wireless 3GPP systems have downlinks that convey information to subscribers at relatively high rates. In MIMO antenna systems, information is transmitted and received independently and simultaneously by more than one antenna thus allowing for relatively high system throughput. MIMO is one proposal being considered for achieving the high data rates for HSDPA. System throughput is typically defined as the total amount of information that is transmitted and received in a system for a defined period of time.

One of the first methods developed for detecting MIMO transmitted symbols was the V-BLAST receiver (Vertical BLAST). In order to receive multiple signals using multiple antennas, the V-BLAST receiver decorrelates multiple streams of information. In VBLAST, the decorrelation of multiple streams of information symbols is essentially an iterative cancellation method whereby the stream having the greatest amount of energy is identified and then is cancelled. This cancellation is done repeatedly until all of the streams have been identified and can thus be properly decoded using well known decoding techniques. The V-BLAST detector is used in BLAST systems containing relatively large number of antennas. For example, V-BLAST is used in a BLAST system having 16 antennas. Although V-BLAST is used for systems with a relatively large number of antennas, it is not an "optimal" receiver because other types of receivers have better performance.

A maximum likelihood (ML) detector looks at all possible combinations of data that can be transmitted for a time interval, and then selects the data set which has the highest probability of being transmitted given the observation of received symbols at the receiver. In a typical wireless communication system that uses digital modulation, the information is transmitted as symbols representing digital information. For example, in a wireless communication system that uses QPSK (Quadrature Phase Shift Keying) a symbol represents two bits of information which can be mapped in a complex constellation plane represented by the I (in-phase) and Q (quadrature phase) channels. The in-phase and quadrature-phase channels are orthogonal to each other.

Referring to FIG. 1, three different complex constellation planes for three different digital modulation schemes are shown. As stated earlier, for QPSK, each symbol represents two bits of information and each symbol has an in-phase component and a quadrature-phase component. Further, each symbol has a complex amplitude that not only describes the magnitude of the symbol but the phase of the symbol with respect to other symbols. For 8-phase Phase Shift Keying (8PSK) each symbol has a complex amplitude and represents three bits of information. For 16 Quadrature Amplitude Modulation (16-QAM), each symbol represents four bits of information and each such symbol also has a complex amplitude. For a BLAST system that uses 4 transmit antennas with QPSK modulation, the system transmits a total of eight bits simultaneously over a symbol period. The symbol period is the amount of time elapsed during the transmission of a symbol. The relatively large gain in capacity of a MIMO system is that it is transmitting multiple constellation points from multiple constellations simultaneously in the same bandwidth whereas a single transmit antenna can only send one constellation point.

In order for an ML detector to compute the highest probability symbol, it must have an estimate of the wireless channel in which the symbols were transmitted. In the case of a MIMO system, the estimate of the channel is a matrix that represents the channels for all possible paths between every transmit and every receive antenna. For example, a 4 transmit by 4 receive MIMO system has 16 individual channel estimations in the matrix. The channel matrix is a matrix containing values that mathematically characterize the communication channel through which the symbols propagate. In many wireless communication systems, a pilot signal or some other reference signal is periodically transmitted over the various communication channels of the system. The pilot signal is either transmitted over its own channel or it can be transmitted over traffic channels used by subscribers of a communication system. The pilot signal's parameters such as amplitude, phase, frequency characteristics are known prior to transmission. After the pilot signal is transmitted and received, its parameters are measured and any modification of any of its parameters is attributed to the communication channel. Thus a channel matrix representing the characteristics of the channel for all of the possible paths of signals transmitted from 4 transmit antennas to 4 receive antennas is generated.

Typically, the assumptions that the communication channel is flat-fading and relatively stable are made because for many communication channels such assumptions are not only reasonable, but are relatively accurate. A flat-fading channel is a communication channel that has no memory; that is, when a signal is transmitted, the signal is eventually received and there exists no delayed replica of the signal. Even in the presence of frequency selective channels with memory, there are techniques to convert the received signal so that the input to the ML detector looks like a flat fading channel. A stable channel is a communication channel whose characteristics change relatively slowly so that the channel matrix is updated at the same relatively slow rate.

It is well known in communication theory that when a signal x (where x is a vector of one or more symbols representing a grouping of bits) is transmitted through a communication channel having a channel matrix H, the resulting symbol received is Hx. In the 4-transmit/receive antenna case where each symbol represents two bits of information (QPSK modulation), the receiver receives symbols representing 8 bits from the 4 transmit antennas. An ML detector generates all possible candidates Hx for all possible values of x. Thus, when x represents an 8-bit grouping, there exists 256 (or $2^8$)

possible Hx candidates assuming that H does not change during the symbol time period; i.e., each of the 256 x groupings is multiplied to H. The ML detector generates the 256 Hx values and compares each such value to the actual symbol received, say r. The difference between Hx and r is referred to as a cost function, J where $J=\|r-Hx\|^2$ and the Hx that generates the lowest J from the 256 comparisons is selected as the best candidate. Thus, a cost function is generated as a result of the ML detection process. The cost function is typically the difference between an actual symbol received and an estimated symbol generated from the channel matrix. The candidate with the lowest cost function is typically selected as the best candidate.

A further refinement of the ML detector is to provide a measure of the confidence in the selection of the highest probability path. This can significantly improve the performance of soft-input forward error correcting codes that are typically used after a detector. The devices that perform the soft input forward error correcting codes use soft information in the processing of received information. In general, soft information is probability data on received information where such data give an indication of the confidence that is to be attributed to the value of the received information. The error correction coding and other channel coding techniques are well known coding schemes used in communication systems in which bits are added to a block of information or information grouping to be transmitted over the communication channels of the communication system. The added bits introduce redundancy to the transmitted bit groupings thus enabling a receiver to better decode the received information and error correct the received information. In many cases, certain bit values are changed when the error correcting coding and the channel coding are performed in light of the soft information. The ML detector provides A Posteriori Probability (APP) information on each received bit. For example, if the cost function for the next closest ML candidate is high, the detector is highly confident in its decision. However, if the next closest candidate is close to the cost function for the winning candidate, then the detector is not very confident of its decision. The soft-input forward error code detector can use the information to help reverse bit decisions on low confidence data if they are found to be probabilistically incorrect. Thus, in general an ML-APP detector is a receiver that selects a symbol candidate as the best candidate from a set of all possible candidates and generates soft information for each of the received symbols.

Because the ML detector is typically implemented with software and because a relatively large number of comparisons (comparing generated candidates to received symbols) is made during a symbol period, the use of an ML detector becomes virtually impractical for relatively high information rate systems such as communication systems that comply with the 3GPP standard. The difficulty in the practical use of an ML detector is further compounded in MIMO systems where the number of candidates used to perform the ML detection increases at an exponential rate. Even for the 4-transmit/receive antenna case using QPSK, the software implementation of the ML detector may not be able to perform the 256 comparisons sufficiently quickly to meet the processing speed requirements of the communication system. In particular, in wireless communication systems complying with the 3GPP standard, the increased rate at which information is conveyed in such systems makes the use of software implemented ML-APP detectors even more impractical. For higher information rates, more symbols are conveyed during a defined period of time and thus the amount of time available to process a symbol is reduced accordingly. Software implemented ML-APP detectors process information at speeds which are functions of a processor speed and processing speeds of the programming language used to program the processor.

SUMMARY OF THE INVENTION

The present invention relates to a communication device comprising a detector coupled to a plurality of antennas. In one embodiment the detector is an ML-APP detector. The ML-APP detector comprises at least one Hx unit coupled to at least one LLR (Log Likelihood Ratio) unit. The at least one Hx unit is configured to generate a special portion of the set of all possible symbol candidates that can be received by a multiple antenna system which is a part of a communication system. The at least one LLR unit performs a cost function analysis whereby it compares each of the symbol candidates generated by the at least one Hx unit to a symbol received from a communication channel of the communication system. When the Hx unit has generated a special portion of all the possible candidates, the at least one LLR unit is able to generate the remainder of the possible candidates by performing a conversion operation on the currently generated symbol candidate; in this manner, the at least one LLR is able to perform a comparison operation on all of the possible symbol candidates for the particular modulation scheme. The at least one LLR unit selects the candidate yielding the smallest cost function as the best candidate. The amount of time used to perform all of the comparison operations for selecting the best candidate is referred to as the calculation period. Therefore, when the at least one Hx unit generates a special portion of the set of all possible symbol candidates, the at least one LLR unit is able to perform a conversion operation on the generated symbol candidates to generate the remainder of the set of all possible symbol candidates allowing the ML-APP detector of the present invention to decode a received symbol within a defined period of time that is less than or equal to a symbol period. In this manner, the ML-APP detector of the present invention is able to detect received symbols at a relatively much higher rate.

DETAILED DESCRIPTION

Figure 1:
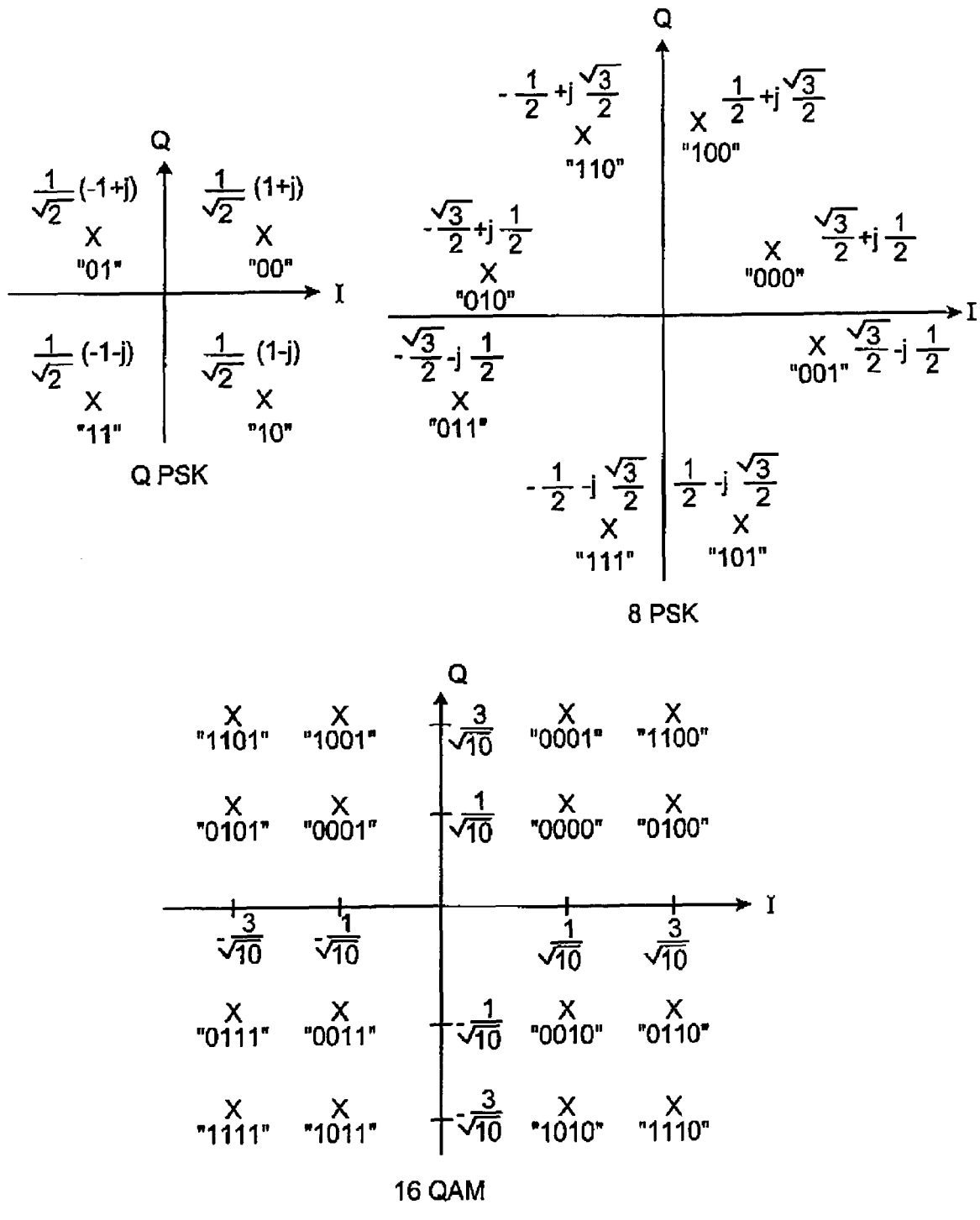
FIG. 1 depicts various types signal constellations for different digital modulation schemes.

The present invention is a communication device comprising a detector coupled to at least two antennas. The at least two antennas or plurality of antennas can be implemented, for example, with a MIMO system. The detector is any receiver that receives symbols (i.e., information) and decodes the receives symbols. In one embodiment the detector is an ML-APP detector. The ML-APP detector comprises at least one Hx unit coupled to at least one LLR (Log Likelihood Ratio) unit. The at least one Hx unit is configured to generate a special portion of the set of all possible symbol candidates that can be received by a multiple antenna system which is a part of a communication system. The special portion is any subset of all the possible candidates (for a particular modulation scheme) from which the remainder of the possible candidates can be generated with the use of a conversion operation. The conversion operation is an operation that transforms a generated symbol candidate to another symbol candidate that has not been generated. The at least one Hx unit has access to a channel matrix, H, that characterizes the communication channels of the communication system through which the received symbols are conveyed. The at least one Hx unit can generate all or a special portion of all the possible symbol candidates by multiplying certain individual information patterns (e.g., bit patterns defined by a signal constellation) to the channel matrix. The at least one Hx unit can then broadcast the generated symbols to one or more LLR units. The output of the at least one Hx unit is independent of the received symbols and can be used to process multiple received symbols. That is, the at least one Hx unit is generating a repeating block of symbol candidates as the symbols are received by the LLR units. The LLR units have access to the at least one Hx unit and can start comparing their received symbols to a symbol candidate generated by the at least one Hx unit at any point in the generation of the repeating block of symbols. Eventually each LLR unit will have compared its received symbol to all of the possible symbol candidates that can be generated by the at least one Hx unit for the modulation scheme being used.

The at least one LLR unit performs a cost function analysis whereby it compares one received symbol to all of the symbols candidates of the special portion generated and broadcast by the at least one Hx unit. Further, when the at least one Hx unit has generated a special portion of the set of all possible candidates, the at least one LLR unit is able to generate the remainder of the possible candidates by performing a conversion operation on the currently generated symbol candidate; in this manner, the at least one LLR is able to perform a comparison operation on all of the possible symbol candidates. The received symbol is designated as r and the possible candidates are designated as Hx where H is the channel matrix and x is a vector of particular information symbols transmitted from each transmit antenna. The vector is a concatenation of constellations points for each transmit antenna, where the constellation points are selected from the bit patterns. The comparison can be done in various manners. In one embodiment, the comparison is implemented by performing a Mean Squared Error (MSE) operation between the received symbol and the generated symbol, i.e., $\|r-Hx\|^2$. The result of the comparison operation is designated as cost function J; that is $J=\|r-Hx\|^2$. After all of the possible symbol candidates have been compared to the received symbol, the at least one LLR unit selects the candidate yielding the smallest cost function as the best candidate. The at least one LLR unit also generates soft information about the selected candidate and passes that information along with the selected candidate to an APP decoder. The amount of time used to perform all of the comparison operations for selecting the best candidate and for generating the soft information is referred to as the calculation period. The selected candidate is then further decoded using well known channel decoding and error correction decoding techniques. Therefore, because the at least one Hx unit is able to generate a special portion of the set of all possible symbol candidates, the at least one LLR unit is able to perform a conversion operation on the generated symbol candidates to generate the remainder of the set of all possible symbol candidates allowing the ML-APP detector of the present invention to detect a received symbol within a defined period of time that is less than or equal to a symbol period. If more than one LLR unit is used in the detector, the decoding for each LLR unit can be set at a multiple of a symbol period (i.e. 2 LLR units each decoding at two times the symbol period). The defined time period is established as the period of a clock used in the ML-APP detector of the present invention. In this manner, the ML-APP detector of the present invention is able to detect received symbols at a relatively much higher rate. The defined time period is established as the period of a clock or a multiple of the period of the clock used in the ML-APP detector of the present invention.

Figure 2:
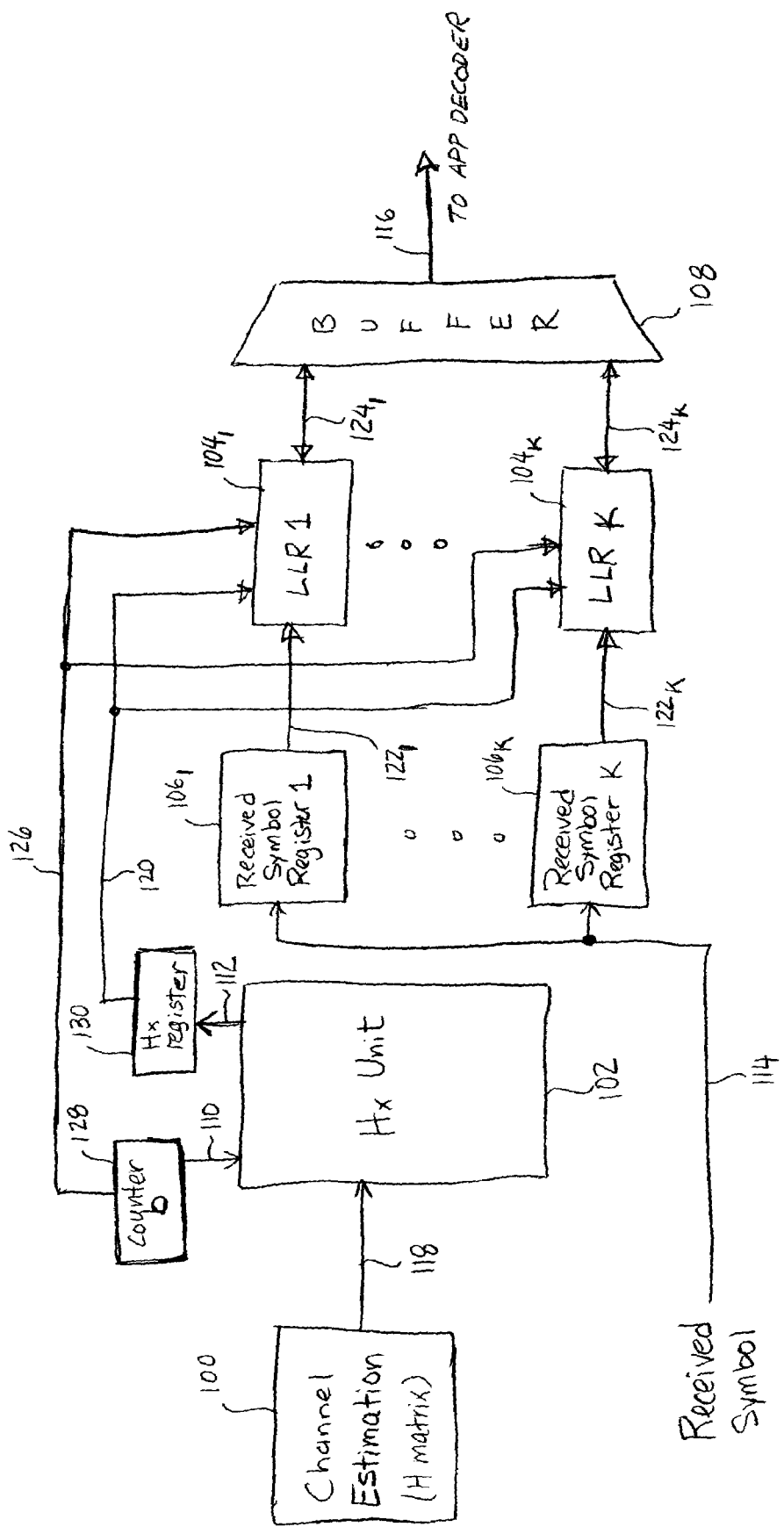
FIG. 2 depicts the architecture of the ML-APP detector of the present invention.

Referring to FIG. 2, there is shown the ML-APP detector of the present invention. It should be noted that the ML-APP detector of the present invention will be described in the context of a wireless communication system using a 4×4 MIMO antenna system that conveys information using QPSK modulation over communication channels of a communication system that complies with the proposed 3GPP HSDPA standard. However, it will be well understood that the use of the ML-APP detector of the present invention is certainly not limited to a particular communication system with a particular digital modulation scheme and is not limited to any particular clock frequency. The clock frequency used for the particular ML detector shown is 122.88 MHz. The clock signal (not shown) is applied to the various devices of the ML-APP detector of the present invention shown in FIG. 2. Further, the ML-APP detector of the present invention can be used in systems with any multiple number of transmit and/or receive antennas. The wireless communication system in which the ML-APP detector of the present invention is used can be a Code Division Multiple Access (CDMA) system, a Frequency Division Multiple Access (FDMA) system, a Time Division Multiple Access (TDMA) system, Orthogonal Frequency Domain Multiplexing (OFDM) or any other type of wireless communication system including systems formed from various combinations of these different types of wireless communication systems. Further, the ML-APP detector of the present invention can be used in wireline communication systems.

The ML-APP detector of the present invention is coupled to a 4-antenna MIMO system (not shown) that is used to receive symbols transmitted by another 4-antenna MIMO system. Because there are 4 transmit antennas transmitting information to 4 receive antennas, each receive antenna can receive symbols from one or all 4 transmit antennas. Thus, there are 16 possible paths of transmission between the 4 transmit antennas and the 4 receive antennas. The 16 possible paths are characterized by a 4×4 channel matrix, H, whose values are stored in device 100. In general, the at least one Hx unit has access to an M×N channel matrix that characterizes L possible communication paths of a wireless communication system which uses a digital modulation scheme to convey symbols where M, N and L are integers equal to 2 or greater and L is the arithmetic product of M and N. In the example given above, M=N=4, L=16, the communication system is 3GPP compliant and the digital modulation scheme is QPSK.

Device 100 can be, for example, a database, or a block of memory implemented with any well known medium (e.g., magnetic disk, optical memory, semiconductor memory). The values of the channel matrix, H, are obtained by measuring various parameters of a reference signal such as a pilot signal. After a defined time period has elapsed, the channel matrix is updated; the time period used to update the channel matrix can be established at a sufficient rate to track changes in the channel. Hx unit 102 has access to the channel matrix values via path 118. It should be noted that one Hx unit is shown here; however, the ML-APP Detector of the present invention can have a plurality of Hx units whereby Q Hx units are used where Q is an integer equal to 1 or greater. In the case where there are Q Hx units, each Hx unit is coupled to all of the LLR units; the Hx units are thus coupled in parallel fashion to the LLR units. Hx unit 102 also has access to information patterns that represent all possible permutations of information patterns that can be transmitted; this is represented by the QPSK constellation shown in FIG. 1. For a 4×4 case, four signal constellations are transmitted simultaneously resulting in an 8-bit vector b-since each antenna can transmit 2 bits at a time where all the possibilities of those two bits are represented by the QPSK signal constellation in FIG. 1. In other words, because there are 4 transmit antennas and each of the 4 antennas can transmit 2 bits of information during a symbol period with QPSK modulation, a total of 8 bits can be received during a symbol period. Thus, there are 256 (i.e., $2^8$) possible combinations for 8 bits. Hx unit 102 can use the 256 transmit bit patterns to multiply each pattern to the channel matrix, H . In particular, each 8-bit pattern is represented as a 4×1 transmit vector of complex numbers. The 4×1 symbol candidate vector is generated by multiplying the 4×4 channel matrix by the 4×1 transmit vector. Each generated symbol candidate is broadcast to K LLR units where K is an integer equal to 1 or greater and K can be equal to Q but is not necessarily equal to Q. The generated symbol candidates are broadcast over path 120 via path 112 and Hx register 130 which is a temporary memory that holds one or more generated symbol candidate(s) until such candidate(s) are to be transferred to an LLR unit that is ready to process the candidate.

Using counter 128 Hx unit 102 can generate all or a special portion of all the possible symbol candidates for the 4×4 antenna system conveying information using QPSK digital modulation. Counter 128 is an M bit counter—where M is equal to 8 or less (i.e., in general, M is an integer equal to or less than the total number of bits in the transmit vector)—that generates the transmit bit patterns or a subset of the transmit bit patterns. Hx unit 102 has access to the generated bit patterns via path 110. When all of the possible 256 patterns are not being generated by counter 128, counter 128, which is one example of a transmit bit pattern generator, generates a special portion of the transmit bit patterns. Other well known bit pattern generator circuits can be used instead of counter 128. Hx 102 multiplies each generated bit pattern to the matrix to generate a special portion of the symbol candidates and broadcasts them to LLR1 through LLR K. Counter 128 also provides the generated bit patterns to the LLR units (via path 126) to allow the LLR units to determine which particular symbol is being generated by Hx unit 102. The special portion is a subset of all the possible permutations of an M-bit (for M=8, 256 permutations or $2^M$) grouping from which the remainder of the permutations can be obtained through a conversion operation by an LLR unit. For example, for M=8, a special portion containing 128 symbol candidates can be generated by Hx unit 102. The conversion operation can be a negation of the 128 generated symbol candidates. When counter 128 is programmed to generate a subset of all the possible patterns, Hx unit 102 generates a special portion of the symbol candidates. The special portion, for example, can represent some of the points in the QPSK constellation where the remainder points can be obtained by rotating 180° from the generated points; in such a case, the conversion operation would be the negation operation. Thus, if a symbol candidate is $Hx_0$, where $x_0$ is a bit pattern from a special portion 128 candidate set, then a second symbol candidate $Hx_1$ can be calculated where $Hx_1=-Hx_0$, i.e., $x_1=-x_0$. Therefore, an Hx unit can use the first 128 groupings of 8 bits to generate the remainder 128 symbol candidates from such a grouping; the first 128 symbol candidates represent the special portion. Therefore, after each generated symbol candidate is transferred to an LLR unit, the LLR unit can generate the complement (e.g., negation of the candidate) to create another symbol candidate; in this manner only 128 of the 256 symbol candidates need be generated by an Hx unit; this results in an increase in the speed of operation of the ML-APP detector.

The negation operation is one example of a conversion operation; other conversion operations can be used to generate symbol candidates from a special portion of all possible symbol candidates. Because each of the bit patterns generated by counter 128 is made available to the LLR units, the LLR units can use such patterns to assist in performing a conversion operation such as negation. To further increase the speed of operation of the ML-APP detector of the present invention, the at least one Hx unit can broadcast more than one symbol candidate simultaneously. In such a case, the partition of the 256 symbol candidates into 128 positive candidates and 128 negative candidates is performed once more so that the 128 positive candidates become 2 groups of 64 positive candidates and the 128 negative candidates become 2 groups of 64 negative candidates. The at least one Hx unit can then broadcast 2 symbol candidates simultaneously from the positive set and the LLR unit therefore can generate two additional symbol candidates by negating the two received positive symbol candidates.

LLR units $104_1$ through $104_K$ compare received symbol, r, to the generated symbol candidate to calculate a cost. The comparison can be done in any one several manners. For example the cost, J, can be the MSE between the received symbol, r, and a generated symbol, i.e., $J=\|r-Hx\|^2$. The cost can also be calculated using the Mean Absolute Error (MAE) between the received symbol and a generated symbol. When MAE is used, the cost function is $J=\|-Hx\|$. LLR units $104_1$ through $104_K$ compare a received symbol, r, to generated symbol candidates transferred from Hx unit 102 and also compare the received symbol to symbol candidates generated from performing a conversion operation on the symbol candidates transferred from Hx unit 102. Thus, when the special portion comprises 128 symbol candidates, the LLR units perform two comparisons per symbol candidate transferred from an Hx unit. When 2 symbol candidates are transmitted from the Hx unit simultaneously, the LLR units perform 4 comparisons per 2 symbol candidates received from the Hx unit.

Each received symbol, r, is transferred to a register $106_1$ through $106_K$ that is associated with an LLR unit that is ready to process such received symbol. The registers temporarily store the received symbol and at the proper time (to be discussed infra) transfer the received symbol to its associated LLR unit 104 via path 122. Registers $106_1$ through $106_K$ can be implemented as a temporary storage locations or memory locations. A register 106 transfers the received symbol, r, to its associated LLR unit when the LLR unit is 'available.' Each LLR unit has four modes: (1) available; (2) running; (3) done and (4) unavailable. The 'available' mode means that the LLR unit is ready to accept a received symbol from receive antennas and start comparing that received symbol with the symbol candidates streaming from the Hx unit. The 'running' mode means that the LLR unit has stored a received symbol, r, and is in the process of calculating one or more costs for all of the possible candidates out of the Hx unit. In the 'running' mode, an LLR unit does not accept any more received symbols. The 'running' mode continues until the LLR unit has observed all possible symbol candidates. The 'done' mode means that a 'running' LLR unit has finished its calculations and transferred the selected candidate and all bit probabilities out to buffer 108. Buffer 108 is a temporary storage device which transfers the soft information and the selected candidates to an APP decoder via path 116. The 'unavailable' mode is where the LLR unit has finished all its observations of symbol candidates, but has yet to transfer the bit probabilities to buffer 108.

LLR units $104_1$ through $104_K$ have a plurality of storage locations within which overall minimum cost for each bit position in the received word (both '0' and '1' combinations for each bit) is stored. For example, with a 4×4 system using QPSK modulation, the LLR unit would store 16 costs-8 costs representing a minimum cost for each of the 8 bit positions when the symbol candidate bits are a '0', and 8 costs representing a minimum cost for each of the 8 bit positions when the symbol candidates bits are a '1'. In order to assign the log likelihood output for each bit, the LLR unit subtracts the minimum cost for a particular bit '0' from the minimum cost for that bit '1' and reports that value as the log-likelihood results; this log likelihood result is the soft information that is used in the subsequent decoding process. This process is repeated for each bit in the possible received vector (i.e., 8 times for 4×4 QPSK). The selected symbol candidates and their associated log likelihood values (i.e., soft information) are transferred from the LLR units to buffer 108 via paths $124_1$ through $124_K$. Thus, an LLR unit not only selects the symbol candidate the lowest cost but generates soft information associated with the selected candidate. During the transfer, an LLR unit is unavailable meaning that the LLR unit cannot receive a symbol candidate or a received symbol, r, during that time. Once the transfer is completed, buffer 108 transmits reset signals via paths $124_1$ through $124_K$ to set the mode of the LLR units to 'available.' It should be noted that the processing performed by the LLR units can be staggered; thus all of the LLR units need not complete or begin their processing at the same time. The channel decoding and the error correction decoding is performed with the help of soft information-about the selected candidate—generated by the LLR units during their comparison operations.

The operations performed by Hx unit 102, LLR units $104_1$ through $104_K$, received symbol registers $106_1$ through $106_K$, counter 128, Hx register 130, channel estimation device 100 and buffer 108 are in synchronization with the clock signal (not shown). The clock signal is usually generated from an oscillating circuit (not shown) that generates a periodic signal of a certain frequency. A received symbol is transferred from a register 106 during a clock cycle, but—as previously discussed—the ML-APP detector of the present invention can increase its processing speed if two symbol candidates (or more) are transferred to the at least one LLR unit in one clock period thus doubling the processing speed. For the case discussed above in which QPSK modulation is being used two LLR units can be used in staggered fashion whereby the ML-APP detector receives symbols every 32 clock cycles whereby it takes an LLR unit 64 clock cycles to process 4 symbol candidates in parallel. When the two LLR units are used in parallel, the MLAPP detector can still produce bit probabilities for each incoming set of symbols every 32 clock cycles. In general, there can be at least W J LLR units operating in staggered fashion where W is an integer and is equal to $$\frac{V}{U}$$

where V represents the number of clock cycles that elapses during a conversion operation by the LLR units and U is an integer equal to the number of clock cycles that elapses between reception of symbols by the LLR units. Therefore, for the example given above, V=64, U=32 and W=2.

In another embodiment of the ML-APP detector of the present invention, only one Hx unit can be used to provide symbol candidates to multiple LLR units. When more than one symbol candidate is generated per clock cycle (such as 4 symbol candidate per clock cycle) by an Hx unit, the LLR units can use a 5-way comparison circuit to calculate a minimum cost based on the minimum stored cost for previous symbol candidates and the costs for the 4 received symbol candidates from the Hx unit. In another embodiment of the present invention, the LLR units can be configured to use the soft information that they have generated to report hard decision values for each of the bit positions of the selected symbol candidate. The hard decision value is a concluded value (either a "0" or a "1" bit) determined with reasonable certainty and based on the soft information. In yet another embodiment of the present invention, the at least one Hx unit calculates the symbol candidates and stores one or more of the possible symbol candidates in Hx register 130. Subsequently, the values from Hx register 130 is provided to the LLR units as long as the H matrix does not change. Therefore, there is no need to calculate symbol candidates (i.e., Hx values) as long as the H matrix does not change.

Therefore, to summarize the method of the present invention as performed by the ML-APP detector described supra, the first step is receiving a symbol conveyed (i.e., transmit and/or received) over a communication channel of a communication system. The received symbol is stored in a received symbol register (e.g., register $106_1$ through $106_K$). A special portion of the set of all possible symbol candidates is then generated by the Hx unit. It should be noted here that the special portion set of symbol candidates can be generated before or after the symbol is received. The special portion set of symbol candidates temporarily stored in Hx register 130 along with the received symbol are transferred to an LLR unit that is available. The LLR unit performs a conversion operation on the symbol candidates from the special portion set to generate the remaining symbol candidates. At this point, with a full set of all possible symbol candidates (for a particular modulation scheme), the LLR unit performs a comparison operation between the received symbol and the generated symbol candidates to calculate a cost for each symbol candidate. The LLR unit then selects the symbol candidate yielding the lowest cost as the detected symbol.

Table 1 below shows the number of LLR units required to maintain the throughput for a proposed HSDPA using a clock frequency of 122.88 MHz and a symbol throughput of 2.4 Msymbols/sec. per antenna. It is important to note that with the number of parallel Hx units equal to 4, only 2 LLR units are needed to maintain the overall required throughput for all cases except 8PSK and 16 QAM with 4 transmit antennas. An 8PSK system with 4 transmit antennas increases the number of LLR units up to 20 and 16 QAM with 4 antennas further increases the number of LLR units to 320.

TABLE 1

Number of LLR units required for desired throughput

| Number of Parallel Hx units | Number of LLR units (2-transmit antennas) | | | Number of LLR units (4 transmit antennas) | | |
|---|---|---|---|---|---|---|
| | QPSK | 8PSK | 16QAM | QPSK | 8PSK | 16QAM |
| 2 | 0.16 | 0.62 | 2.5 | 2.5 | 40 | 640 |
| 4 | 0.08 | 0.31 | 1.25 | 1.25 | 20 | 320 |

It will be readily understood by one skilled in the art to which this invention belongs that the ML-APP detector of the present invention can be implemented with digital logic circuitry and/or analog circuitry using semiconductor, optical or electro optic technology.

I claim:

1. A communication device comprising:
   a maximum likelihood a posteriori probability (ML-APP) detector for generating at least a subset of symbol candidates, at least one log likelihood ratio (LLR) unit configured to perform a conversion operation on symbol candidates from the subset of symbol candidates to generate additional ones of the symbol candidates and calculate a cost by comparing a received symbol to all of the generated symbol candidates; and
   at least two antennas coupled to the detector.

2. The communication device of claim 1 where the ML-APP detector comprises at least one Hx unit that is coupled to the at least one LLR unit and where the at least one Hx unit is configured to generate all of the symbol candidates.

3. The communication device of claim 2 where the symbol candidates to be converted by the at least one LLR unit are obtained from an Hx register coupled to the Hx unit, wherein the Hx register stores the generated symbol candidates created from an H matrix and a transmit bit pattern generator coupled to the Hx unit, wherein the Hx register is updated when the H matrix has changed.

4. The communication device of claim 1 where the at least one LLR unit has four modes of operation comprising an available mode, a running mode, an unavailable mode and a done mode.

5. The communication device of claim 1 comprising a register coupled to the at least one LLR unit and wherein the received symbol is temporarily stored within the register.

6. The communication device of claim 1 having at least W LLR units operating in staggered fashion where W is an integer and is equal to V/U where V represents the number of clock cycles that elapses during a conversion operation by an LLR unit and U is an integer equal to the number of clock cycles that elapses between reception of symbols by the LLR units.

7. The communication device of claim 6 where V=64 clock cycles, U=32 clock cycles thereby having a total of 2 LLR units and comprising an Hx unit that generates 4 symbols per clock cycle.

8. The communication device of claim 1 where the at least one LLR unit determines hard decision values for each bit position of a selected symbol candidate, the hard decision values are based on soft information associated with the selected symbol candidate, and the soft information is generated by the at least one LLR unit.

9. The communication device of claim 1 where the ML-APP detector comprises at least one Hx unit coupled to the at least one LLR unit and where the at least one Hx unit is configured to generate at least the subset of symbol candidates.

10. The communication device of claim 9 where the at least one Hx unit and the at least one LLR unit operate in synchronization with a clock.

11. The communication device of claim 9 where the at least one Hx unit has access to a channel matrix that characterizes communication channels of a communication system through which the received symbol is conveyed to the ML-APP detector.

12. The communication device of claim 9 where the at least one Hx unit has access to a M×N channel matrix that characterizes L possible communication paths of a wireless communication system which uses a digital modulation scheme to convey symbols where M, N and L are integers equal to 2 or greater and L is the arithmetic product of M and N.

13. The communication device of claim 12 where M=N=4, L is 16and the digital modulation scheme is quadrature phase shift keying.

14. The communication device of claim 1, wherein the detector comprises a Hx unit that generates the subset of symbol candidates by multiplying a bit pattern by a channel matrix corresponding to a channel over which the received symbol is received by the detector.

15. The communication device of claim 14, wherein the Hx unit provides the subset of symbol candidates to the LLR unit and the LLR unit generates a remainder of all possible symbol candidates.

16. The communication device of claim 15, wherein the conversion operation comprises rotating at least some of the symbols in the subset provided to the LLR by 180 degrees.

17. A communication device comprising:
   a maximum likelihood a posteriori probability (ML-APP) detector for generating at least a subset of symbol candidates, at least W log likelihood ratio (LLR) units configured to perform a conversion operation on candidates from the subset of symbol candidates to generate additional symbol candidates and calculate a cost by comparing a received symbol to all of the generated symbol candidates, wherein the at least W LLR units operate in staggered fashion, where W is an integer equal to V/U where V represents the number of clock cycles that elapses during a conversion operation by an LLR unit and U is an integer equal to the number of clock cycles that elapses between reception of symbols by the LLR units; and
   at least two antennas coupled to the detector.

18. A communication device comprising:
   a maximum likelihood a posteriori probability (ML-APP) detector for generating at least a subset of symbol candidates, at least one LLR unit configured to perform a conversion operation on candidates from the subset of symbol candidates to generate additional symbol candidates and calculate a cost by comparing a received symbol to all of the generated symbol candidates, the at least one LLR unit determines hard decision values for each bit position of a selected symbol candidate, the hard decision values are based on soft information associated with the selected symbol candidate, the soft information is generated by the at least one LLR unit; and
   at least two antennas coupled to the detector.

19. A communication device comprising:
   a maximum likelihood a posteriori probability (ML-APP) detector for generating at least a subset of symbol candidates, at least one LLR unit configured to perform a conversion operation on candidates from the subset of symbol candidates to generate additional symbol candidates and calculate a cost by comparing a received symbol to all of the generated symbol candidates, wherein the ML-APP detector comprises at least one Hx unit coupled to the at least one LLR unit, the at least one Hx unit is configured to generate at least the subset of symbol candidates, the at least one Hx unit and the at least one LLR unit operate in synchronization with a clock; and
   at least two antennas coupled to the detector.

20. A communication device comprising:
   a maximum likelihood a posteriori probability (ML-APP) detector for generating at least a subset of symbol candidates, at least one LLR unit configured to perform a conversion operation on candidates from the subset of symbol candidates to generate additional symbol candidates and calculate a cost by comparing a received symbol to all of the generated symbol candidates, wherein the subset of symbol candidates to be converted by the at least one LLR unit are obtained from an Hx register coupled to a Hx unit, the Hx register stores the generated symbol candidates created from an H matrix and a transmit bit pattern generator coupled to the Hx unit, and the Hx register is updated when the H matrix has changed; and at least two antennas coupled to the detector.

* * * * *

UNITED STATES PATENT AND TRADEMARK OFFICE
CERTIFICATE OF CORRECTION

PATENT NO. : 7,609,777 B2 Page 1 of 1
APPLICATION NO. : 10/231980
DATED : October 27, 2009
INVENTOR(S) : David Garrett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1853 days.

Signed and Sealed this

Twelfth Day of October, 2010

David J. Kappos
*Director of the United States Patent and Trademark Office*